(12) United States Patent
Zelig et al.

(10) Patent No.: US 7,697,525 B2
(45) Date of Patent: Apr. 13, 2010

(54) FORWARDING MULTICAST TRAFFIC OVER LINK AGGREGATION PORTS

(75) Inventors: David Zelig, Ramat-Gan (IL); Rafi Ram, Herzlia (IL); Leon Bruckman, Petah Tikva (IL); Zeev Oster, Modi'in (IL); Ronen Solomon, Givatayim (IL)

(73) Assignee: Corrigent Systems Ltd., Tel Aviv (IL)

( * ) Notice: Subject to any disclaimer, the term of this patent is extended or adjusted under 35 U.S.C. 154(b) by 635 days.

(21) Appl. No.: 11/644,773

(22) Filed: Dec. 21, 2006

(65) Prior Publication Data

US 2008/0151890 A1 Jun. 26, 2008

(51) Int. Cl.
  *H04L 12/56* (2006.01)
(52) U.S. Cl. ............... 370/390; 370/230.1; 455/453
(58) Field of Classification Search ......... 370/229–235, 370/389, 390; 455/453
See application file for complete search history.

(56) References Cited

U.S. PATENT DOCUMENTS

| | | | |
|---|---|---|---|
| 5,285,441 A | 2/1994 | Bansal et al. | |
| 5,933,422 A | 8/1999 | Kusano et al. | |
| 6,169,783 B1 | 1/2001 | Brooks et al. | |
| 6,205,488 B1 | 3/2001 | Casey et al. | |
| 6,275,493 B1 | 8/2001 | Morris et al. | |
| 6,304,575 B1 | 10/2001 | Carroll et al. | |
| 6,339,595 B1 | 1/2002 | Rekhter et al. | |
| 6,466,985 B1 | 10/2002 | Goyal et al. | |
| 6,600,741 B1 | 7/2003 | Chrin et al. | |
| 6,604,136 B1 | 8/2003 | Chang et al. | |
| 6,625,155 B1 | 9/2003 | Dziong | |
| 6,628,624 B1 | 9/2003 | Mahajan et al. | |
| 6,760,775 B1 | 7/2004 | Anerousis et al. | |
| 6,765,921 B1 | 7/2004 | Stacey et al. | |
| 6,778,496 B1 | 8/2004 | Meempat et al. | |
| 6,886,043 B1 | 4/2005 | Mauger et al. | |
| 7,158,486 B2 | 1/2007 | Rhodes | |
| 2002/0176450 A1 | 11/2002 | Kong et al. | |
| 2003/0002506 A1* | 1/2003 | Moriwaki et al. | ............ 370/392 |
| 2003/0103449 A1 | 6/2003 | Barsheshet et al. | |
| 2003/0158930 A1 | 8/2003 | Mc Bride | |
| 2003/0223428 A1 | 12/2003 | Blanquer Gonzalez et al. | |

(Continued)

OTHER PUBLICATIONS

Mamakos, et al., "A Method for Transmitting PPP Over Ethernet (PPPoE)", Internet Engineering Task Force (IETF) Request for Comments (RFC) 2516, Feb. 1999.

(Continued)

*Primary Examiner*—Ricky Ngo
*Assistant Examiner*—Gary Mui
(74) *Attorney, Agent, or Firm*—Darby & Darby P.C.

(57) ABSTRACT

A network node in a communication network includes a plurality of ports, at least a subset of which is grouped in a link aggregation (LAG) group. The node includes packet processing logic, which is coupled to receive data packets having respective destination addresses that specify forwarding the packets to groups of multiple recipients through at least one of the ports and to process the data packets so as to forward only a single copy of each of the data packets via the output ports in the subset, while distributing forwarded copies of the data packets among the output ports in the subset so as to balance a traffic load within the LAG group.

24 Claims, 1 Drawing Sheet

U.S. PATENT DOCUMENTS

| | | | |
|---|---|---|---|
| 2004/0008687 | A1 | 1/2004 | Matsubara |
| 2004/0017816 | A1 | 1/2004 | Ishwar et al. |
| 2004/0174887 | A1* | 9/2004 | Lee .................. 370/395.53 |
| 2004/0202171 | A1 | 10/2004 | Hama |
| 2005/0030948 | A1 | 2/2005 | Wyatt |
| 2005/0041665 | A1* | 2/2005 | Weyman et al. ............. 370/390 |
| 2005/0125490 | A1 | 6/2005 | Ramia |
| 2005/0163115 | A1 | 7/2005 | Dontu et al. |
| 2005/0238018 | A1* | 10/2005 | Devi et al. .................. 370/389 |
| 2005/0276263 | A1* | 12/2005 | Suetsugu et al. ............ 370/389 |
| 2007/0038767 | A1 | 2/2007 | Miles et al. |
| 2008/0031263 | A1 | 2/2008 | Ervin et al. |

OTHER PUBLICATIONS

Rosen, et al., "Multiprotocol Label Switching Architecture", IETF RFC 3031, Jan. 2001.

D. Tsiang, et al., "The Cisco SRP MAC Layer Protocol", IETF RFC 2892, Aug. 2000.

Malkin, G. "RIP Version 2", IETF RFC 2453, Nov. 1998.

Finlayson, et al., "A Reverse Address Resolution Protocol", IETF RFC 903, Jun. 1984.

Bradley, et al., "Multiprotocol Interconnect over Frame Relay", IETF RFC 1490, Jul. 1993.

Baker, et al., "PPP Bridging Control Protocol (BCP)", IETF RFC 1638, Jun. 1994.

Deering, S., "Host Extensions for IP Multicasting", IETF RFC 1112. Aug. 1989.

Plummer, D., "An Ethernet Address Resolution Protocol", IETF RFC 826, Nov. 1982.

Carrier sense multiple access with collision detection (CSMA/CD) access method and physical layer specifications, Clause 43 of IEEE Standard 802.3a, 2002 Edition.

Dziong, et al., "A framework for bandwidth management in ATM networks—Aggregate equivalent bandwidth estimation approach", IEEE/ACM transactions on networking, vol. 5, No. 1, Feb. 1997.

"Inverse multiplexing over ATM", Strategic Technologies Group, Jul. 12, 2001.

Sklower, et al., "The PPP multilink protocol (MP)", IETF RFC 1990, Aug. 1996.

Switch Fabric Data Sheet for 89TSF500 by IDT Inc., www.idt.com.

FAP20V by Dune Networks, Inc., www.dunenetworks.com.

Switch Fabric PRS80G Device by AMCC, available: http://www.amcc.com/MyAMCC/jsp/public/productDetail/product_detail.jsp?productID=PRS80G.

Kompella, et al., "Virtual private LAN service (VPLS) using BGP for auto-discovery and signaling", available: https://datatracker.ietf.org/drafts/, filename: draft-ietf-l2vpn-vpls-bgp-08, Jun. 1006.

Lasserre, et al., "Virtual private LAN services using LDP", available: https://datatracker.ietf.org/drafts/, filename: draft-ietf-l2vpn-vpls-ldp-09, Jun. 2006.

Augustyn, et al., "Service requirements for layer 2 provider-provisioned virtual private networks", IETF RFC 4665, Sep. 2006.

\* cited by examiner

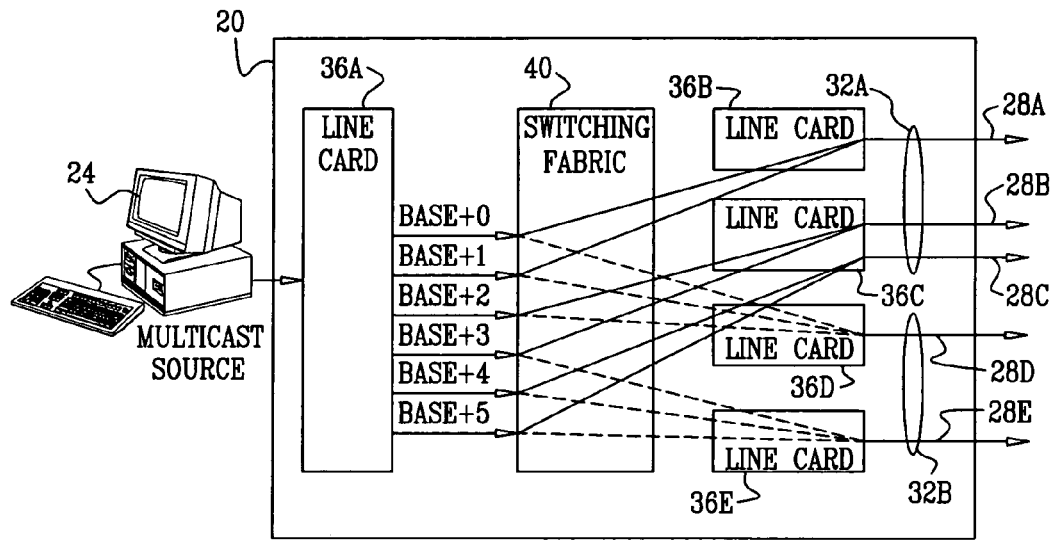
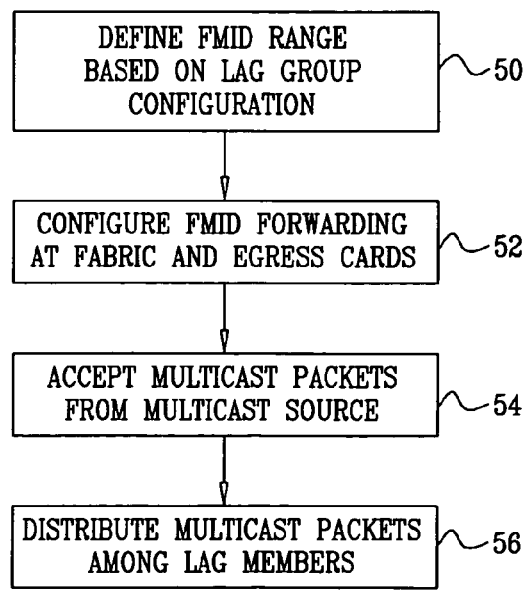

FORWARDING MULTICAST TRAFFIC OVER LINK AGGREGATION PORTS

FIELD OF THE INVENTION

The present invention relates generally to communication networks, and particularly to methods and systems for forwarding multicast traffic in communication networks.

BACKGROUND OF THE INVENTION

Virtual private local area network service (VPLS) is a point-to-multipoint service, which emulates local area network (LAN) functionality over provider networks. VPLS is described, for example, by Augustyn and Serbest in Internet Engineering Task Force (IETF) Request for Comments (RFC) 4665, entitled "Service Requirements for Layer 2 Provider-Provisioned Virtual Private Networks," RFC 4665, 2006-09; by Lasserre and Kompella in "Virtual Private LAN Services Using LDP," IETF Internet draft, 2006-06; and by Kompella and Pekhter in "Virtual Private LAN Service (VPLS) Using BGP for Auto-discovery and Signaling," IETF Internet draft, 2006-06, which are incorporated herein by reference.

Link aggregation (LAG) is a technique by which a group of parallel physical links between two endpoints in a data network can be joined together into a single logical link (referred to as a "LAG group"). Traffic transmitted between the endpoints is distributed among the physical links in a manner that is transparent to the clients that send and receive the traffic. For Ethernet™ networks, link aggregation is defined by Clause 43 of IEEE Standard 802.3, Carrier Sense Multiple Access with Collision Detection (CSMA/CD) Access Method and Physical Layer Specifications (2002 Edition), which is incorporated herein by reference.

SUMMARY OF THE INVENTION

There is therefore provided, in accordance with an embodiment of the present invention, a network node in a communication network, including:

a plurality of ports, at least a subset of which is grouped in a link aggregation (LAG) group; and packet processing logic, which is coupled to receive data packets having respective destination addresses that specify forwarding the packets to groups of multiple recipients through at least one of the ports and to process the data packets so as to forward only a single copy of each of the data packets via the output ports in the subset, while distributing forwarded copies of the data packets among the output ports in the subset so as to balance a traffic load within the LAG group.

In some embodiments, the node includes line cards that are connected to the ports and a switching fabric that interconnects the line cards, the packet processing logic is resident in the switching fabric, and the line cards are arranged to receive the data packets from the ports and to forward the data packets to the switching fabric without duplicating the data packets.

In another embodiment, two or more subsets of the ports are grouped respectively in two or more LAG groups, and the switching fabric is configured to duplicate the data packet and to forward a copy of the data packet to only one of the line cards serving each of the subsets, while distributing forwarded copies of the data packets among the output ports of each of the subsets so as to balance a traffic load within the LAG groups.

In yet another embodiment, the data packets include multicast packets. In still another embodiment, the data packets include packets of a virtual private local area network service (VPLS). Alternatively, the data packets may include packets of a native multicast forwarding application.

In some embodiments, the packet processing logic is arranged to allocate to each of the received data packets a fabric multicast identification (FMID) value selected from a range of possible FMID values, each FMID being associated with one of the ports in the subset, and to forward the single copy to the port associated with the allocated FMID value. In another embodiment, the packet processing logic is arranged to distribute the allocated FMID values among the possible FMID values in the range such that the traffic load is balanced among the ports in the subset. The packet processing logic may be arranged to re-distribute the allocated FMID values upon a change in a number of active ports in the subset, such that the traffic load is balanced among the active ports.

In an embodiment, the packet processing logic is arranged to determine the allocated FMID value for each of the data packets by applying a hashing function to fields of the data packets, so as to balance the distribution. Alternatively, the packet processing logic is arranged to determine the allocated FMID value for each of the data packets based on a predetermined mapping of header fields of the data packets to the FMID values, so as to balance the distribution.

In another embodiment, the packet processing logic includes multiple line cards connected to the ports and a switching fabric interconnecting the line cards and, for each of the received data packets, a first line card connected to a first port via which the data packet is received is arranged to allocate the FMID value to the packet and to forward the packet to the switching fabric, and the switching fabric and a second line card connected to a second port to which the data packet is to be sent are configured to forward the data packet responsively to the FMID value.

In yet another embodiment, the first line card is arranged to assign to the data packets line card FMID (LC-FMID) values selected from a first range of possible LC-FMID values, and the switching fabric is arranged to map the LC-FMID values to respective central FMID (C-FMID) values selected from a second range of possible C-FMID values that is smaller than the first range and to forward the data packets responsively to the C-FMID values. In still another embodiment, multiple LC-FMID values are mapped to a single C-FMID value, and the switching fabric is configured to minimize data packet duplication caused by mapping the multiple LC-FMID values.

There is additionally provided, in accordance with an embodiment of the present invention, a method for communication, including:

receiving data packets having respective destination addresses that specify forwarding the packets to groups of multiple recipients through at least one of a plurality of ports, at least a subset of which is grouped in a link aggregation (LAG) group; and processing the data packets so as to forward only a single copy of each of the data packets via the output ports in the subset while distributing forwarded copies of the data packets among the output ports in the subset so as to balance a traffic load within the LAG group.

The present invention will be more fully understood from the following detailed description of the embodiments thereof, taken together with the drawings in which:

BRIEF DESCRIPTION OF THE DRAWINGS

FIG. 1 is a block diagram that schematically illustrates a network node, in accordance with an embodiment of the present invention; and FIG. 2 is a flow chart that schematically illustrates a method for forwarding multicast traffic, in accordance with an embodiment of the present invention.

DETAILED DESCRIPTION OF EMBODIMENTS

Overview

Network nodes typically comprise multiple line cards interconnected by a switching fabric, with each line card supporting one or more output ports. A network node forwards traffic to multiple destinations, which are often referred to as connection termination points (CTP). Some destinations, referred to as grouped destinations, are served by multiple output ports, which are grouped into LAG groups. The output ports in each LAG group may be distributed among different line cards.

A node that supports VPLS or a native multicast application is often requested to forward multicast packets to a group of multiple destinations served by the node, including the grouped destinations. Embodiments of the present invention provide improved methods and systems for forwarding multicast packets to grouped destinations.

In some embodiments, the node assigns a range of N virtual addresses, called fabric multicast IDs (FMIDs), to each multicast source. The ingress card, i.e., the line card via which the multicast packets enter the node, selects and assigns one of the N FMIDs to each multicast packet, and forwards the packet to the switching fabric. Typically, the node attempts to assign the different FMIDs in the range evenly. The switching fabric is pre-configured to forward each multicast packet to a single output port in each LAG group, based on the FMID assigned to the packet. When the packet needs to be sent to multiple LAG groups, the switching fabric duplicates the packet.

Unlike some known methods and systems in which multicast packets are forwarded to all output ports in a particular LAG group and then discarded by some of the output cards, the methods and systems described herein ensure that a particular multicast packet is forwarded only once to each LAG group in the first place. As a result, node bandwidth is not wasted. Forwarding only a single copy of a multicast packet across the node to the grouped destination significantly increases the capacity of the node.

Unlike some known methods and systems in which all multicast packets are sent to the same LAG group port, the methods and systems described herein distribute multicast packets approximately evenly among the different output ports of the LAG group. Thus, the traffic load within the group is balanced, and distribution of additional unicast traffic across the group is simplified.

Although it is possible to duplicate the multicast packet in the ingress card and then distribute the packet replicas via the fabric to the egress cards, this method imposes an unnecessary traffic load on the ingress card and on the interface between the ingress card and the switching fabric. In the methods and network elements described herein, on the other hand, the multicast packet is forwarded to the fabric without duplication. The fabric duplicates the multicast packet when necessary (i.e., when the packet should be forwarded to multiple LAG groups), and forwards a single copy of the packet to each LAG group. Thus, load balancing is achieved without adding unnecessary traffic load inside the node due to packet duplication.

These benefits are particularly significant in multicast applications that use large bandwidths, such as Internet Protocol television (IPTV), Near Video on Demand (NVOD) and video conferencing, which are becoming increasingly important.

Although the description that follows refers mainly to multicast packets, the methods and systems described herein can be used to forward any type of data packets addressed to multiple recipients, such as broadcast packets, bridging packets and VPLS or bridging flooded packets.

System Description

FIG. 1 is a block diagram that schematically illustrates a network node 20, in accordance with an embodiment of the present invention. Node 20 is part of a packet-switched communication network, and provides virtual private LAN services (VPLS). Although the embodiments described below refer to VPLS, the methods and systems described herein can also be used in nodes that carry out native multicast forwarding processes, such as IP multicast or bridge multicast.

As part of the VPLS functionality, node 20 forwards data packets identified as multicast packets (i.e., having a multicast destination address) to all destinations served by the VPLS in the node. The set of destinations served by a particular VPLS is referred to as the multicast scope. In some applications, the multicast scope may comprise a subset of the of the potential VPLS destinations, for example when only a subset of the VPLS destinations are expected to carry a specific multicast stream. Each logical or physical destination is commonly referred to as a separate connection termination port (CTP).

In some embodiments, one or more of the CTPs served by node 20 may comprise grouped destinations. Each grouped destination uses multiple physical output ports, which are grouped using link aggregation (LAG). The ports belonging to a particular LAG group are referred to as group members.

For example, in the exemplary configuration of FIG. 1, node 20 accepts multicast packets from a multicast source 24 and forwards the packets to two CTPs denoted 32A and 32B. CTP 32A comprises three physical ports 28A . . . 28C, which are configured as a LAG group. CTP 32B comprises two physical ports 28D and 28E, which are configured as another LAG group. The terms CTP and LAG group are sometimes used interchangeably below. Node 20 may comprise additional CTPs (not shown in the figure), which comprise a single physical port. Such single ports are often regarded and managed by the node as LAG groups having a single member. Thus, in the context of the present patent application and in the claims, the term "LAG group" is used to cover groups having multiple members, as well as single ports that are treated as single-member LAG groups.

Typically, each node runs one or more virtual switching instances (VSI), which perform bridging among different virtual interfaces. The virtual interfaces may comprise, for example, physical interfaces, virtual LAN (VLAN) interfaces, ring interfaces and pseudo-wire (PW) interfaces.

Node 20 comprises line cards, which process the data packets entering and leaving the node. Typically, each line card performs both ingress and egress processing, i.e., processes both incoming and outgoing packets, respectively. In the exemplary configuration of FIG. 1, node 20 comprises five line cards denoted 36A . . . 36E. Line card 36A, which is referred to hereinbelow as the ingress card, accepts multicast packets from multicast source 24. Line cards 36B . . . 36E, which are referred to hereinbelow as the egress cards, are connected to the different output ports. Note that output ports belonging to a particular LAG group may be served by different line cards.

Node 20 comprises a switching fabric 40, which accepts packets from the ingress cards and routes them to the appropriate egress cards. For example, switching fabric 40 may be implemented using the FAP20V fabric access processor, produced by Dune Networks Inc., (Sunnyvale, Calif.). Another switch fabric device, which can be used for this purpose is the 89T5F500 device, produced by IDT, Inc. (San Jose, Calif.). Yet another switch fabric device is the PRS80G device, produced by AMCC (Sunnyvale, Calif.). Further alternatively, any other suitable device can be used.

Forwarding Multicast Packets

Some known methods and systems forward multicast packets to all egress cards (output line cards) that serve a certain LAG group. Since each LAG group is expected to output only a single copy of each multicast packet, some of the egress cards in the group discard the multicast packet. Such methods and systems typically use the node bandwidth inefficiently when forwarding copies of multicast packets to multiple egress cards.

Other known methods and systems forward all multicast traffic to a single port of the LAG group. When using such methods and systems, the overall distribution of traffic (unicast and multicast) among the LAG ports is often unbalanced. Additionally, it is often difficult for such methods and systems to handle multicast traffic bandwidth that is higher than the capacity of a single LAG group member.

Unlike the known methods and network elements which forward multiple copies of multicast packets to all egress cards, node 20 forwards only a single copy of a particular multicast packet over the node to each LAG group using methods that are described below. In other words, only a single copy of a particular multicast packet is forwarded toward a single egress card out of the egress card composing the LAG group.

Unlike the known methods and network elements which forward multicast packets over a particular LAG group member, node 20 distributes the multicast packets approximately evenly among the different members of each LAG group, so as to balance the traffic load within the group and enable simple, balanced forwarding of the additional unicast traffic.

It is possible in principle to duplicate the multicast packet in the ingress card, and then to distribute the replicas of the multicast packet to the fabric and egress cards. This method, however, imposes an unnecessary traffic load on the ingress card and on the interface between the ingress card and the switching fabric.

Node 20, on the other hand, forwards only a single copy of each multicast packet to the fabric without duplication. The fabric duplicates the multicast packet and forwards a copy of the packet to each participating egress card. Thus, load balancing is achieved without adding unnecessary traffic load inside the node due to packet duplication.

In some embodiments, each multicast source is assigned a range of N virtual addresses called fabric multicast IDs (FMIDs). The considerations for selecting the value of N, the number of FMIDs, are described further below. The ingress card assigns one of the N FMIDs to each multicast packet arriving from the multicast source. The assignment of FMIDs to multicast packets attempts to distribute the packets approximately evenly among the different FMIDs in the range.

For example, the ingress card may determine the FMID of a particular multicast packet by applying a hashing function to header fields of the multicast packets, and taking a modulo N of the hash result. Any suitable header fields can be used for this purpose, such as IP header fields and media access control (MAC) address fields.

Alternatively, the ingress card can use a predetermined mapping of header fields, such as destination IP addresses or pairs of source and destination IP addresses, to FMID values. This technique is particularly suitable for use in IPTV applications and in Internet Group Management Protocol (IGMP) and/or Protocol Independent Multicast (PIM) aware systems, in which the number of active channels and their related bandwidths are known.

The multicast packets are provided to fabric 40 along with their respective FMIDs. Both fabric 40 and the egress cards are pre-configured to forward each multicast packet to the appropriate output port based on its FMID. In some embodiments, fabric 40 comprises a forwarding table, which maps FMIDs to line cards, i.e., defines the line card to which a multicast packet having a certain FMID is to be routed. Each line card comprises another forwarding table, which maps FMIDs to output ports. Thus, each multicast packet is assigned an FMID by the ingress card, and then forwarded to a particular output port by the fabric and egress card, based on its FMID. Alternatively, node 20 may comprise any other suitable switching logic that forwards multicast packets to the appropriate output ports using the methods described herein.

The selection of N and the mapping of FMIDs to egress cards and output ports ensure that each multicast packet is forwarded only once to each LAG group, and that multicast packets are distributed approximately evenly among the members of each LAG group.

For example, in the configuration of FIG. 1, six FMIDs denoted base+0 through base+5 are used, i.e., N=6. In the present example, FMIDs are expressed in terms of a fixed base address and an offset. As can be seen in the figure, the fabric and egress cards are configured so that multicast packets are forwarded in accordance with the following table:

| LAG group | Output port | FMIDs |
| --- | --- | --- |
| 32A | 28A | base+0, base+1 |
|  | 28B | base+2, base+3 |
|  | 28C | base+4, base+5 |
| 32B | 28D | base+0, base+1, base+2 |
|  | 28E | base+3, base+4, base+5 |

This forwarding scheme ensures that (1) each multicast packet is forwarded exactly once to each LAG group and (2) multicast packets are distributed evenly (assuming the hashing is even) among the output ports of each LAG group. Note that the fabric and/or egress cards sometimes generate multiple copies of multicast packets. The fabric may duplicate a multicast packet in order to forward it to different egress cards (a single copy per card), while the egress card may duplicate the packet again if multiple LAG groups are served by the same card.

A similar scheme can be used when there is a need to send the multicast packet to a single (i.e., non LAG) physical interface. In this case, all the FMIDs, in the example above base+0, base+1, base+2, base+3, Base+4 and base+5, will be mapped into this physical interface. Thus, as noted above, the fabric treats single ports as LAG groups having a single member.

The value of N is typically selected based on the number of members in the different LAG groups. In the present example, the value N=6 was selected because the node supports LAG groups having two and three members. Generally, if N is selected to be a common multiple of the sizes of the different LAG groups (i.e., if each LAG group size supported by node 20 is a divisor of N), then it is possible to distribute the N FMIDs evenly among the members of each LAG group.

In some embodiments, the number of LAG group members that are active at a given time may change, for example as a result of configuration changes or because output ports are taken out of service due to failures. In such cases, in order to allow even traffic distribution among the remaining ports without loss of traffic, the node re-arranges the mapping of ports to FMIDs. For example, the following table describes a re-arranged mapping of ports to FMIDs in the configuration of FIG. 1 above, following a failure of port 28C:

| LAG group | Output port | FMIDs |
|---|---|---|
| 32A | 28A | base+0, base+1, base+4 |
|  | 28B | base+2, base+3, base+5 |
|  | 28C | Not connected |
| 32B | 28D | base+0, base+1, base+2 |
|  | 28E | base+3, base+4, base+5 |

As can be seen in the table, the FMIDs base+4 and base+5, which were both originally mapped to port 28C, are now mapped to ports 28A and 28B, respectively.

Thus, in some embodiments, the selection of N takes into account the different numbers of active ports in the LAG groups, and not only the maximum or nominal size of each LAG group. For example, if a particular node supports a maximum LAG group size of four ports, each LAG group may comprise from one to four active ports at any given time. Selecting N=2·3·4=12 ensures even distribution for any number of active ports.

In some embodiments, the number of allocable FMIDs is limited due to implementation constraints. In such cases, smaller values of N that do not provide a perfectly even distribution can be used, without significantly degrading the quality of the distribution. For example, in order to provide a perfectly even FMID distribution for LAG groups of up to eight ports, a minimum value of N=840 is needed. However, choosing a much smaller value of N=24 is often adequate. N=24 provides optimal distribution for 1, 2, 3, 4, 6 and 8 ports, and approximately uniform distribution for 5 and 7 ports.

The node configuration of FIG. 1 is an exemplary configuration, chosen purely for the sake of conceptual clarity. In alternative embodiments, node 20 may comprise any number of line cards, input ports, output ports and LAG groups. Each node may serve any number of multicast sources and CTPs. Each line card may serve any number of individual output ports and/or ports grouped in LAG groups.

The functions of node 20 described herein can be embodied in hardware or firmware, such as using one or more application-specific integrated circuits (ASICs) and/or field-programmable gate arrays (FPGAs). Additionally or alternatively, some or all node functions can be implemented in software, such as using a network processor. Node 20 may also comprise a combination of hardware and software elements.

FIG. 2 is a flow chart that schematically illustrates a method for provisioning and forwarding multicast traffic, in accordance with an embodiment of the present invention. The method begins by defining the appropriate FMID range according to the LAG group configuration of node 20, at a range definition step 50. Node 20 configures the forwarding tables of the fabric and egress cards, at a configuration step 52.

Node 20 accepts multicast packets from the multicast source, at a packet acceptance step 54. The node forwards the multicast packets to the appropriate output ports, at a forwarding step 56. As noted above, the ingress card assigns an FMID from the range to each multicast packet, and the fabric and egress cards forward the packets in accordance with the pre-configured forwarding tables.

The description above refers to a single VSI and a single multicast source. In some embodiments, a different range of FMIDs (e.g. a different base address) can be defined for each VSI and/or for each multicast source.

The methods and systems described herein can also be used for forwarding other types of packets. For example, in some scenarios, node 20 is requested to forward a unicast packet to a particular destination address whose media access control address (MAC) is currently unknown to the node. This scenario may occur, for example, when a MAC-learning process (in which the node associates MAC destination addresses of other nodes in the network with the output ports through which these nodes are reachable) is not yet completed. When the node cannot determine through which output port a unicast packet is to be forwarded to a particular destination MAC address, the node may transmit the packet to all output ports in a process referred to as flooding. Flooding of unicast packets can also be implemented using the methods and systems described herein.

In some embodiments, the total number of allocable FMIDs is lower in the switching fabric than in the line cards. In other words, fabric 40 may have an FMID space having a smaller number of bits than the FMID space of the line cards. For example, the line cards may support 13-bit FMIDs, referred to hereinbelow as line card FMIDs (LC-FMIDs), while the fabric may only support 11-bit FMIDs, referred to as central FMIDs (C-FMIDs). In these cases, multiple LC-FMIDs correspond to a particular C-FMID. Depending on the fabric definition, the C-FMID may comprise, for example, the least significant bits (LSB) or the most significant bits (MSB) of the LC-FMID.

The fabric forwards copies of the multicast packet to all egress cards having at least one output port that corresponds to the C-FMID. Because of the association of multiple LC-FMIDs to a single C-FMID, superfluous multicast packets may be forwarded to egress cards unnecessarily, which causes unnecessary packet duplication and adds an unnecessary load to the interface between the fabric and the egress cards. The superfluous copies are typically discarded by the egress cards.

In some embodiments, the LC-FMID values in node 20 are selected so as to reduce the number of unnecessarily duplicated multicast packets. For example, when the C-FMID is defined as the 11 MSB of the LC-FMID, assigning LC-FMIDs having successive values causes successive LC-FMIDs to be mapped to the same C-FMID with high probability, thus reducing the number of unnecessary packet duplication. As another example, when the C-FMID is defined as the 11 LSB of the LC-FMID, successive LC-FMIDs will inevitably map to different C-FMIDs, resulting in a high number of duplicated packets. In order to avoid this situation, the 13-bit LC-FMID can be modified. For example, the two LSB and the two MSB of the LC-FMID can be swapped with one another so that originally-successive LC-FMIDs will map to different C-FMIDs.

The value of N, the number of LC-FMIDs used, also has an effect on the number of duplicated packets. Increasing the value of N usually reduces unnecessary packet duplication.

The following table shows several node configurations with the corresponding inefficiencies of the interface between the fabric and egress cards. Each row in the table refers to a particular node configuration having a certain number of active LAG members. In each configuration, the LAG members are divided among up to three egress cards denoted A, B and C. The table shows the LC-FMIDs assigned to the different LAG members for N=12 and N=24. The percentages shown for some of the configurations give the percentage of excessive (i.e., above optimal) traffic load on the interface between the switching fabric and the line card. Lower percentages indicate higher efficiencies.

| Total number of active LAG members | LAG member distribution among egress card(s) | LC-FMID (offset from base) assuming N = 12 | LC-FMID (offset from base) assuming N = 24 |
|---|---|---|---|
| 1 | 1 in A | 0-11 | 0-23 |
| 2 | 1 in A | 0-5 (33%) | 0-11 |
|   | 1 in B | 6-11 (33%) | 12-23 |
| 2 | 2 in A | 0-5, 6-11 | 0-11, 12-23 |
| 3 | 1 in A | 0-3 | 0-7 |
|   | 1 in B | 4-7 | 8-15 |
|   | 1 in C | 8-11 | 16-23 |
| 3 | 2 in A | 0-3, 4-7 | 0-7, 8-15 |
|   | 1 in B | 8-11 | 16-23 |
| 3 | 3 in A | 0-3, 4-7, 8-11 | 0-7, 8-15, 16-23 |
| 4 | 1 in A | 0-2 (33%) | 0-5 (33%) |
|   | 1 in B | 3-5 (167%) | 6-11 (33%) |
|   | 1 in C | 6-8 (167%) | 12-17 (33%) |
|   | 1 in D | 9-11 (33%) | 18-23 (33%) |
| 4 | 2 in A | 0-2, 3-5 (133%) | 0-5, 6-11 |
|   | 1 in B | 6-8 (33%) | 12-17 (33%) |
|   | 1 in C | 9-11 (33%) | 18-23 (33%) |
| 4 | 3 in A | 0-2, 3-5, 6-8 (33%) | 0-5, 6-11, 12-17 (11%) |
|   | 1 in B | 9-11 (33%) | 18-23 (33%) |
| 4 | 2 in A | 0-2, 3-5 (33%) | 0-5, 6-11 |
|   | 2 in B | 6-8, 9-11 (33%) | 12-17, 18-23 |
| 4 | 4 in A | 0-2, 3-5, 6-8, 9-11 | 0-5, 6-11, 12-17, 18-23 |

Although the embodiments described herein mainly address forwarding of multicast packets over LAG, the methods and systems described herein can also be used for forwarding multicast packets over high capacity ring networks in which communication rings are grouped using link aggregation methods. High capacity ring networks of this sort are described, for example, in U.S. patent application Ser. No. 11/367,231, filed Mar. 2, 2006, which is assigned to the assignee of the present patent application and is incorporated herein by reference.

The methods and systems described herein are not limited to VPLS, and can be used in other applications such as in IP routers that perform IP multicast forwarding. In these applications, multicast group destinations are defined by a multicast tree created by the applicable multicast routing protocol. Similar methods can also be used in bridges.

Moreover, the methods and systems described herein can be used in any application in which packets are multiplied or duplicated and sent to a group of interfaces or destinations. Such applications are sometimes collectively referred to in the art as Equal Cost Multi Path (ECMP) entities. ECMP entities may comprise, for example, a group of Multi-Protocol Label Switching (MPLS) tunnels, which reach the same destination node via multiple different routes.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A network node in a communication network, comprising:
   a plurality of ports, at least a subset of which is grouped in a link aggregation (LAG) group; and
   packet processing logic, which is coupled to receive data packets having respective destination addresses that specify forwarding the packets to groups of multiple recipients through at least one of the ports and to process the data packets so as to forward only a single copy of each of the data packets via the output ports in the subset, while distributing forwarded copies of the data packets among the output ports in the subset so as to balance a traffic load within the LAG group;
   wherein:
   the packet processing logic is arranged to allocate to each of the received data packets a fabric multicast identification (FMID) value selected from a range of possible FMID values, each FMID being associated with one of the ports in the subset, and to forward the single copy to the port associated with the allocated FMID value;
   the packet processing logic comprises multiple line cards connected to the ports and a switching fabric interconnecting the line cards, wherein, for each of the received data packets, a first line card connected to a first port via which the data packet is received is arranged to allocate the FMID value to the packet and to forward the packet to the switching fabric, and wherein the switching fabric and a second line card connected to a second port to which the data packet is to be sent are configured to forward the data packet responsively to the FMID value; and
   the first line card is arranged to assign to the data packets line card FMID (LC-FMID values selected from a first range of possible LC-FMID values, and wherein the switching fabric is arranged to map the LC-FMID values to respective central FMID (C-FMID values selected from a second range of possible C-FMID values that is smaller than the first range and to forward the data packets responsively to the C-FMID values.

2. The node according to claim 1, comprising line cards that are connected to the ports and a switching fabric that interconnects the line cards, wherein the packet processing logic is resident in the switching fabric, and wherein the line cards are arranged to receive the data packets from the ports and to forward the data packets to the switching fabric without duplicating the data packets.

3. The node according to claim 2, wherein two or more subsets of the ports are grouped respectively in two or more LAG groups, and wherein the switching fabric is configured to duplicate the data packet and to forward a copy of the data packet to only one of the line cards serving each of the subsets, while distributing forwarded copies of the data packets among the output ports of each of the subsets so as to balance a traffic load within the LAG groups.

4. The node according to claim 1, wherein the data packets comprise multicast packets.

5. The node according to claim 1, wherein the data packets comprise packets of a virtual private local area network service (VPLS).

6. The node according to claim 1, wherein the data packets comprise packets of a native multicast forwarding application.

7. The node according to claim 1, wherein the packet processing logic is arranged to distribute the allocated FMID values among the possible FMID values in the range such that the traffic load is balanced among the ports in the subset.

8. The node according to claim 7, wherein the packet processing logic is arranged to re-distribute the allocated FMID values upon a change in a number of active ports in the subset, such that the traffic load is balanced among the active ports.

9. The node according to claim 7, wherein the packet processing logic is arranged to determine the allocated FMID value for each of the data packets by applying a hashing function to fields of the data packets, so as to balance the distribution.

10. The node according to claim 7, wherein the packet processing logic is arranged to determine the allocated FMID value for each of the data packets based on a predetermined mapping of header fields of the data packets to the FMID values, so as to balance the distribution.

11. The node according to claim 1, wherein multiple LC-FMID values are mapped to a single C-FMID value, and wherein the switching fabric is configured to minimize data packet duplication caused by mapping the multiple LC-FMID values.

12. A method for communication, comprising:
receiving data packets having respective destination addresses that specify forwarding the packets to groups of multiple recipients through at least one of a plurality of ports, at least a subset of which is grouped in a link aggregation (LAG) group; and
processing the data packets so as to forward only a single copy of each of the data packets via the output ports in the subset while distributing forwarded copies of the data packets among the output ports in the subset so as to balance a traffic load within the LAG group;
wherein:
processing the data packets comprises allocating to each of the received data packets a fabric multicast identification (FMID) value selected from a range of possible FMID values, the FMID value being associated with one of the ports in the subset, and forwarding the single copy to the port associated with the allocated FMID value;
for each of the received data packets, processing the data packets comprises allocating the FMID value to the data packet by a first line card connected to a first port via which the data packet is received, and configuring a second line card connected to a second port to which the data packet is to be sent and a switching fabric interconnecting the first and second line cards to forward the data packet responsively to the FMID value; and
allocating the FMID value comprises assigning to the data packets line card FMID (LC-FMID) values selected from a first range of possible LC-FMID values, and wherein configuring the switching fabric comprises mapping the LC-FMID values to respective central FMID (C-FMID) values selected from a second range of possible C-FMID values that is smaller than the first range and forwarding the data packets responsively to the C-FMID values.

13. The method according to claim 12, wherein, for each of the data packets, processing the data packet comprises forwarding the data packet without duplication from an ingress line card connected to a first port via which the data packet is received to a switching fabric, and forwarding the data packet by the switching fabric to an egress line card, which is connected to a second port via which the data packet is to be sent.

14. The method according to claim 13, wherein two or more subsets of the ports are grouped respectively in two or more LAG groups, and wherein forwarding the data packet by the switching fabric comprises duplicating the data packet and forwarding a copy of the data packet to only one of the line cards serving each of the subsets, while distributing forwarded copies of the data packets among the output ports of each of the subsets so as to balance a traffic load within the LAG groups.

15. The method according to claim 12, wherein the data packets comprise multicast packets.

16. The method according to claim 12, wherein the data packets comprise packets of a virtual private local area network service (VPLS).

17. The method according to claim 12, wherein the data packets comprise packets of a native multicast forwarding application.

18. The method according to claim 12, wherein at least some of the ports are grouped in one or more LAG groups, and wherein processing the data packets comprises selecting a number of the possible FMID values responsively to possible numbers of ports in each of the one or more LAG groups.

19. The method according to claim 12, wherein distributing the forwarded copies comprises distributing the allocated FMID values among the possible FMID values in the range, such that the traffic load is balanced among the ports in the subset.

20. The method according to claim 19, wherein distributing the allocated FMID values comprises re-distributing the allocated FMID values upon a change in a number of active ports in the subset, such that the traffic load is balanced among the active ports.

21. The method according to claim 19, wherein balancing the distribution comprises determining the allocated FMID value of each of the data packets by applying a hashing function to fields of the data packets.

22. The method according to claim 19, wherein balancing the distribution comprises determining the allocated FMID value of each of the data packets based on a predetermined mapping of header fields of the data packets to the FMID values.

23. The method according to claim 12, wherein mapping the LC-FMID values comprises mapping multiple LC-FMID values to a single C-FMID value, and wherein configuring the switching fabric comprises minimizing data packet duplication caused by mapping the multiple LC-FMID values.

24. The method according to claim 12, wherein mapping the LC-FMID values comprises mapping multiple LC-FMID values to a single C-FMID value, and wherein allocating the FMID value and configuring the second line card and switching fabric comprises selecting a number of the possible LC-FMID values in the first range in order to minimize data packet duplication caused by mapping the multiple LC-FMID values.

\* \* \* \* \*